(12) United States Patent
Podda et al.

(10) Patent No.: US 11,891,187 B2
(45) Date of Patent: Feb. 6, 2024

(54) AIRCRAFT

(71) Applicant: LEONARDO S.P.A., Rome (IT)

(72) Inventors: Daniele Podda, Samarate (IT); Andrea Gabrielli, Samarate (IT); Roberto Regonini, Samarate (IT); Federico Montagna, Samarate (IT); Stefano Poggi, Samarate (IT)

(73) Assignee: LEONARDO S.P.A., Rome (IT)

( * ) Notice: Subject to any disclaimer, the term of this patent is extended or adjusted under 35 U.S.C. 154(b) by 401 days.

(21) Appl. No.: 17/414,499

(22) PCT Filed: Nov. 28, 2019

(86) PCT No.: PCT/IB2019/060299
§ 371 (c)(1),
(2) Date: Jun. 16, 2021

(87) PCT Pub. No.: WO2020/128691
PCT Pub. Date: Jun. 25, 2020

(65) Prior Publication Data
US 2022/0073201 A1  Mar. 10, 2022

(30) Foreign Application Priority Data

Dec. 21, 2018  (EP) ..................................... 18215247

(51) Int. Cl.
*B64D 35/00*  (2006.01)
*B64C 29/00*  (2006.01)
(Continued)

(52) U.S. Cl.
CPC .......... *B64D 35/00* (2013.01); *B64C 29/0033* (2013.01); *F16C 19/18* (2013.01);
(Continued)

(58) Field of Classification Search
CPC ............................ B64C 35/00; F16C 2326/43
See application file for complete search history.

(56) References Cited

U.S. PATENT DOCUMENTS

| | | | |
|---|---|---|---|
| 4,605,185 A | * | 8/1986 | Reyes .................... B64D 35/00 244/58 |
| 2005/0238274 A1 | | 10/2005 | Zernikow et al. |
| 2017/0305565 A1 | | 10/2017 | Kooiman et al. |

FOREIGN PATENT DOCUMENTS

| | | |
|---|---|---|
| CN | 105 114 452 | 10/2018 |
| DE | 15 25 256 | 9/1969 |

(Continued)

*Primary Examiner* — Nicholas McFall
(74) *Attorney, Agent, or Firm* — Leason Ellis LLP (57) ABSTRACT

An aircraft is described comprising: a support element; a shaft rotating about an axis; a pair of oblique rolling bearings mounted so as to couple the shaft to the support element rotatingly about the axis; the rolling bearings comprising: respective first races cooperating radially in contact with a first component defined by one from the support element and the shaft; respective second races cooperating radially in contact with a second component defined by the other from the support element and the shaft; and respective pluralities of rolling elements adapted to roll on the first and second races; the aircraft further comprises a pair of preloaded elastic members, which couple the first races to the first component respectively, axially and in an elastically yielding manner.

14 Claims, 6 Drawing Sheets

(51) Int. Cl.
*F16C 19/18* (2006.01)
*F16C 19/54* (2006.01)
*F16C 25/08* (2006.01)

(52) U.S. Cl.
CPC .......... *F16C 19/543* (2013.01); *F16C 25/083* (2013.01); *F16C 2326/43* (2013.01)

(56) References Cited

FOREIGN PATENT DOCUMENTS

| | | |
|---|---|---|
| DE | 10 2013 004499 | 9/2014 |
| FR | 3 042 562 | 4/2017 |
| JP | 6 169576 | 7/2017 |

\* cited by examiner

AIRCRAFT

CROSS-REFERENCE TO RELATED APPLICATIONS

This patent application is a U.S. National Phase Application under 35 U.S.C. § 371 of International Patent Application No. PCT/IB2019/060299, filed on Nov. 28, 2019, which claims priority from European patent application no. 18215247.0 filed on Dec. 21, 2018, all of which are incorporated by reference, as if expressly set forth in their respective entireties herein.

TECHNICAL FIELD

The present invention relates to an aircraft and, more particularly, to a convertiplane.

The present invention also relates to a method of operating an aircraft.

BACKGROUND ART

As is known, convertiplanes are hybrid aircraft with tilting rotors.

In greater detail, convertiplanes are aircraft capable of selectively assuming an "airplane" configuration, wherein the rotors are arranged with respective first axes substantially parallel to a second longitudinal axis of the convertiplane, or a "helicopter" configuration, wherein the rotors are arranged with the respective first axes substantially vertical and transversal to the aforesaid second longitudinal axis of the convertiplane.

Due to the possibility of tilting the rotors, convertiplanes can take-off and land like a helicopter, i.e. without requiring a runway, as well as on rough ground and without generating a level of noise, which is incompatible with an urban settlement.

Additionally, convertiplanes can hover when arranged in the helicopter configuration.

Convertiplanes can also reach and maintain cruising speeds of about 500 km/h and flying altitudes in the order of 7500 metres, when arranged in the airplane configuration.

Such cruising speed is far greater than the value of about 300 km/h defining the maximum cruising speed of helicopters.

Similarly, the aforesaid altitude is far greater than that typical of helicopters and allows convertiplanes in airplane mode to avoid the clouds and atmospheric disturbances characteristic of lower altitudes.

Convertiplanes of the known type essentially comprise:
a fuselage;
a pair of half wings arranged in a cantilever fashion on respective sides of the fuselage, opposite each other;
a pair of nacelles housing relative rotors, which are tiltable with the relative rotors with respect to the relative half wing about a third lateral axis, which is orthogonal to the second longitudinal axis and to the first axes of the rotors when the convertiplane is in the helicopter configuration;
a pair of motors to control the rotation of the rotors independently; and
a pair of aeronautical transmissions respectively, which couple the motors to the respective rotors.

In a known manner, each rotor comprises a drive shaft rotating about the relative first axis and a plurality of articulated blades on the drive shaft.

Furthermore, in a known manner, each transmission comprises an external casing and a plurality of transmission shafts, including, in particular, an input shaft connected to the motor and an output shaft connected to the drive shaft and rotating in response to the rotation of the input shaft.

In each transmission, the respective transmission shafts are typically supported by the external casing by means of support assemblies comprising rolling bearings.

In particular, the rolling bearings offer the relative transmission shaft both an axial and a radial support.

The use is known in aeronautical transmissions, both in convertiplanes and in aircraft in general, of hybrid rolling bearings, wherein the rolling elements and the rings are made of ceramic material and alloy steel respectively.

Such hybrid rolling bearings have the advantage of being lighter and having a dynamic behavior, superior to that of normal rolling bearings, especially when used in aeronautical applications, where the operating temperatures and lubrication conditions are particularly critical.

However, the same hybrid rolling bearings have disadvantages in relation to the different coefficient of thermal expansion between the material of the rolling bodies and that of the rings.

In fact, the assembly clearances between the rings and the rolling elements increase significantly when the operating temperature rises, since the rings are subject to greater expansion than the rolling elements.

Thus, the increase in the aforesaid clearances results in a considerable deterioration in the performance and stability of the rolling bearings.

Furthermore, the risk of overheating and complete loss of stability of the transmissions becomes concrete when the operating temperatures vary significantly and rapidly and/or when problems relating to the lubrication of the bearings arise.

On the other hand, the assembly clearances close when the operating temperatures lower significantly, since the rings contract more than the rolling elements.

Thus, the reduction in the clearances results in the overloading of the rings and the rolling elements.

Consequently, the need is felt to develop aircraft, which benefit from the advantages offered by the use of hybrid rolling bearings, but which, at the same time, don't suffer from the aforesaid disadvantages.

Furthermore, problems relating to different expansions between rings and rolling elements can also be found when the latter are made of the same material and the bearings are subject to considerable thermal gradients.

In fact, in rolling bearing of an aeronautical transmission, the outermost ring and the innermost ring can nonetheless be subject to different temperature conditions, depending on the operating conditions of the aircraft carrying the transmission.

In particular, if the inner ring had a higher temperature than that of the outer ring, the assembly clearances would tend to close with the consequent overloading of the rolling bearing.

Vice versa, if the outer ring had a higher temperature than that of the inner ring, the assembly clearances would tend to increase with the consequent loss of stability of the rolling bearing.

Therefore, more generally, the need is further felt to develop aircraft, which are marginally affected by the aforesaid problems.

US-A-2017/0305565 discloses a propulsion system for a tiltrotor aircraft including an engine supported by the airframe and a fixed gearbox operably coupled to the engine.

Inboard and outboard pedestals are supported by the airframe and positioned above the wing. A pylon assembly is rotatably coupled between the inboard and outboard pedestals. The pylon assembly includes a spindle gearbox having an input gear, a mast operably coupled to the input gear and a proprotor assembly operable to rotate with the mast. The spindle gearbox is rotatable about a conversion axis to selectively operate the tiltrotor aircraft between helicopter and airplane modes. A common shaft, rotatable about the conversion axis, is configured to transfer torque from an output gear of the fixed gearbox to the input gear of the spindle gearbox. Each of the inboard and outboard pedestals includes a journal bearing that provides a stiff coupling with the pylon assembly.

CN-A-105114452 discloses a bearing pair and a bearing pair assembly. The bearing pair comprises a left bearing and a right bearing, wherein the axes of the left bearing and the right bearing extend in the left-right direction. The bearing pair further comprises an annular installation space arranged on one of the bearings or crossing the butt-joint end surfaces of the left bearing and the right bearing, having an axis extending along in the left-right direction, and used for installing a preloaded spring, wherein a left stop surface used for limiting the preloaded spring to move to the left is arranged on the left bearing and at the left side of the annular installation space; and a right stop surface used for limiting the preloaded spring to move to the right is arranged on the right bearing and at the right side of the annular installation space. The bearing pair assembly provided by the invention is simple in structure, low in manufacturing cost, and low in pairing difficulty; and axial preloading for the bearing pair is realized through the preloaded spring, the operation is flexible and convenient, the preloading is effective and insusceptible to external environment temperature, and control for the preloading is accurate and convenient.

JP-A-6169576 discloses a pre-stress structure in a rotating anode x-ray tube device whereby no delay is present, and no excessive load is incurred, due to necessary pre-loading, which is to say, thermal conduction. A rotating anode x-ray tube device comprises a cathode and a rotating anode. The rotating anode further comprises: rotating bodies which rotate with an anode target; a bearing unit for lubricating the rotation of the rotating bodies; and a fixed body which rotatably supports the rotating bodies via the bearing unit. The bearing unit further comprises: a plurality of bearings which are positioned along the axial directions of the rotating bodies; and pre-load structures which are individually disposed upon each bearing. With respect to each respective bearing, each respective pre-load structure imparts a pre-load quantity to the bearings which is lower than loads which are imparted to the bearings from the rotating bodies, with the directions of the axes of rotation of the rotating bodies matching the direction of gravity.

US-A-2005/0238274 discloses an electrical machine, in particular an electric motor, with a housing and covers that close the housing and contain bearings that rotatably support a rotor. Spring elements are provided that act upon at least one bearing shell each of bearings with a compression force acting in the axial direction, whereby the mounting of the bearing shell that is acted upon by one of the spring elements is configured as a sliding fit.

FR-A-3042562 discloses a speed reducer comprising a shaft extending along a longitudinal axis, two bearings arranged around the shaft, the two bearings each comprising a radially outer ring, a radially inner ring and rolling elements arranged between the radially outer and inner rings. The speed reducer further comprises a pre-load system positioned in the gap between the two bearings, this pre-load system comprising: two spacer elements bearing each with one of the rings of the bearings, at least one elastically deformable element interposed between the two spacer elements, configured to be able to occupy a first pre-stressed state and a second at least partially relaxed state, the pre-charge system being arranged so that the passage from the first state to the second state of said at least one elastically deformable element causes a unidirectional displacement in rotation of each spacer element with respect to the other, so as to generate a wedge effect load in the bearings.

DE-A-1525256 discloses a method and a device for utilizing a pair of rolling bearings.

DE-A-102013004499 discloses a system consisting of two bearing inner rings fixedly arranged at a distance on a shaft or a shaft with two integrated raceways and two spaced at a distance in the sliding seat on a component bearing outer rings and each between the associated bearing inner rings and bearing outer rings on raceways rolling elements An intermediate element is arranged between the two bearing outer rings, which limits the axial bearing clearance and consists of a material which has a higher coefficient of linear expansion than the material of the bearing inner rings.

DISCLOSURE OF INVENTION

Thus, it is an object of the invention to develop an aircraft, which allows at least one of the previously presented needs to be met in a simple and cost-effective manner.

The aforesaid object is achieved by the invention, since it relates to an aircraft, as defined in claim 1.

The present invention also relates to a method of operating an aircraft, as defined in claim 14.

BRIEF DESCRIPTION OF THE DRAWINGS

For a better understanding of the invention, a preferred embodiment is described below, by way of a non-limiting example, with reference to the appended drawings, wherein.

BEST MODE FOR CARRYING OUT THE INVENTION

Figure 1:
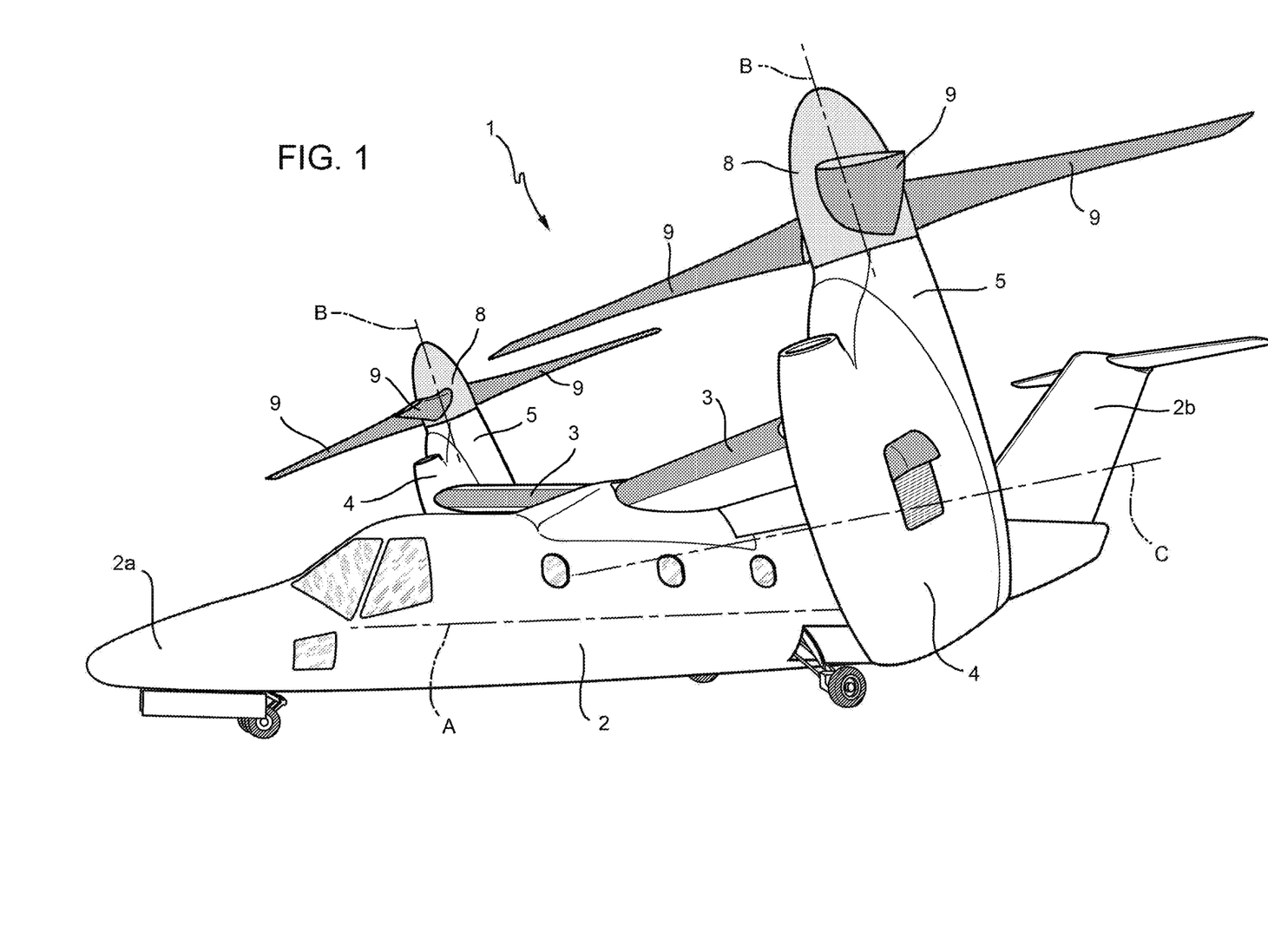
FIG. 1 is a front view of an aircraft, in particular a convertiplane, made according to the invention.

In FIG. 1, numeral reference 1 is used to indicate an aircraft and, more specifically, a convertiplane.

The aircraft 1 essentially comprises:
- a fuselage 2 having a longitudinal extension axis A between a nose 2a and a tail portion 2b opposite along the axis A;
- a pair of half-wings 3 extending in a cantilever fashion from respective opposite sides of the fuselage 2 and transversely to the axis A;
- a pair of nacelles 4; and
- a pair of rotors 5.

Figure 2:
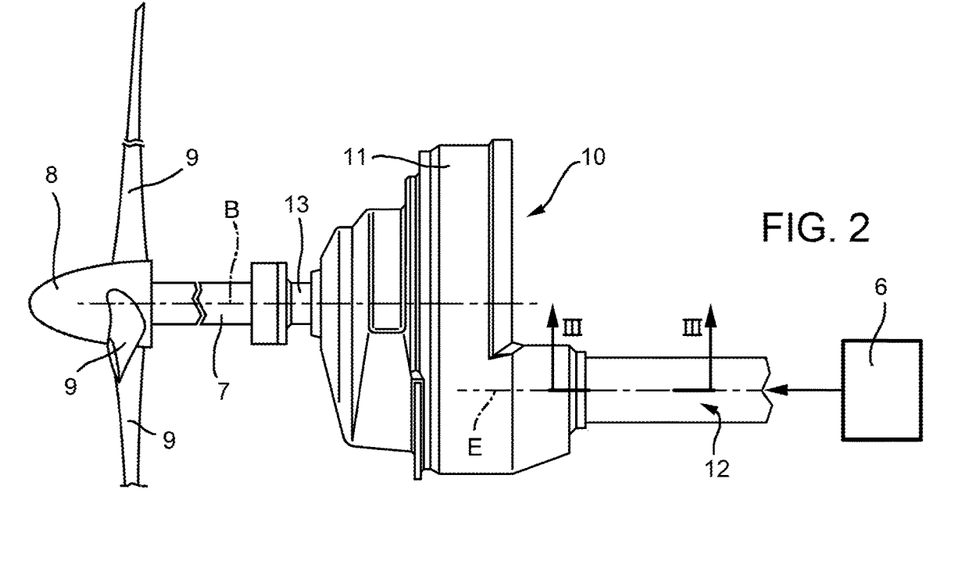
FIG. 2 is a schematic plan view of a transmission of the aircraft in FIG. 1.

In greater detail, as schematized in FIG. 2, each rotor 5 essentially comprises:
- a motor 6;
- a drive shaft 7 rotating about an axis B;
- a hub 8 dragged into rotation by the drive shaft 7; and
- a plurality of articulated blades 9 on the hub 8.

The nacelles 4 are tiltable about an axis C relating to the half wings 3.

The axis C is transversal to the axis A and to the axes B.

The aircraft 1 can selectively be arranged:
- in a "helicopter" configuration, wherein the axes B of the rotors 5 are orthogonal to the axis A and to the axis C; and
- in an "airplane" configuration, wherein the axes B of the rotors 5 are parallel to the axis A and orthogonal to the axis C.

Figure 3:
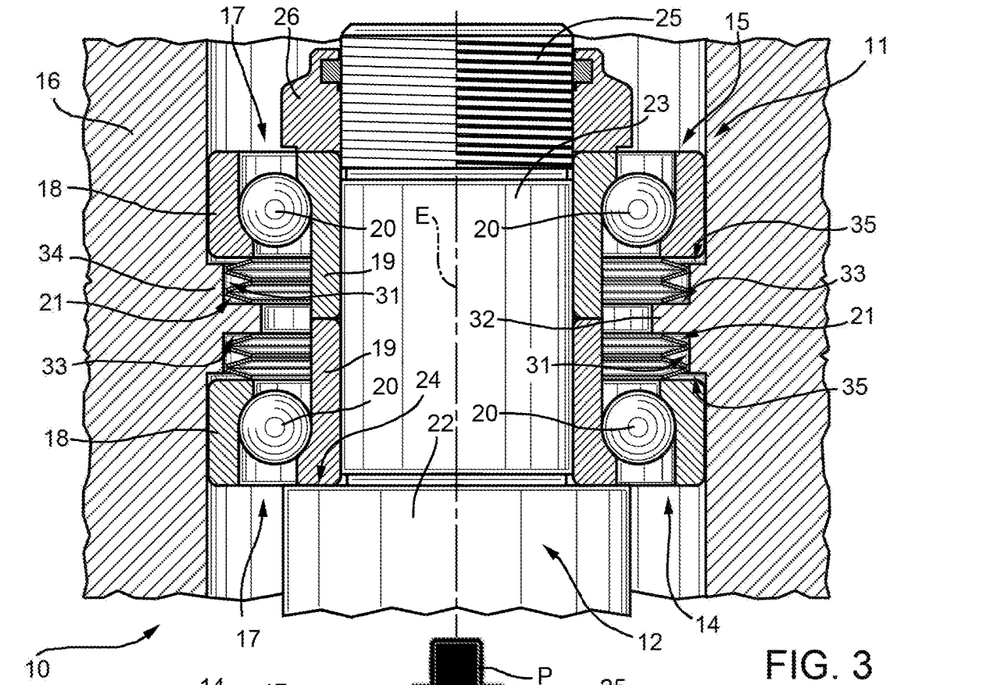
FIGS. 3 and 4 are sections on an enlarged scale of a portion of the transmission in FIG. 2, taken according to the line III-III in FIG. 2 and relating to two different respective operating configurations.
Figure 4:
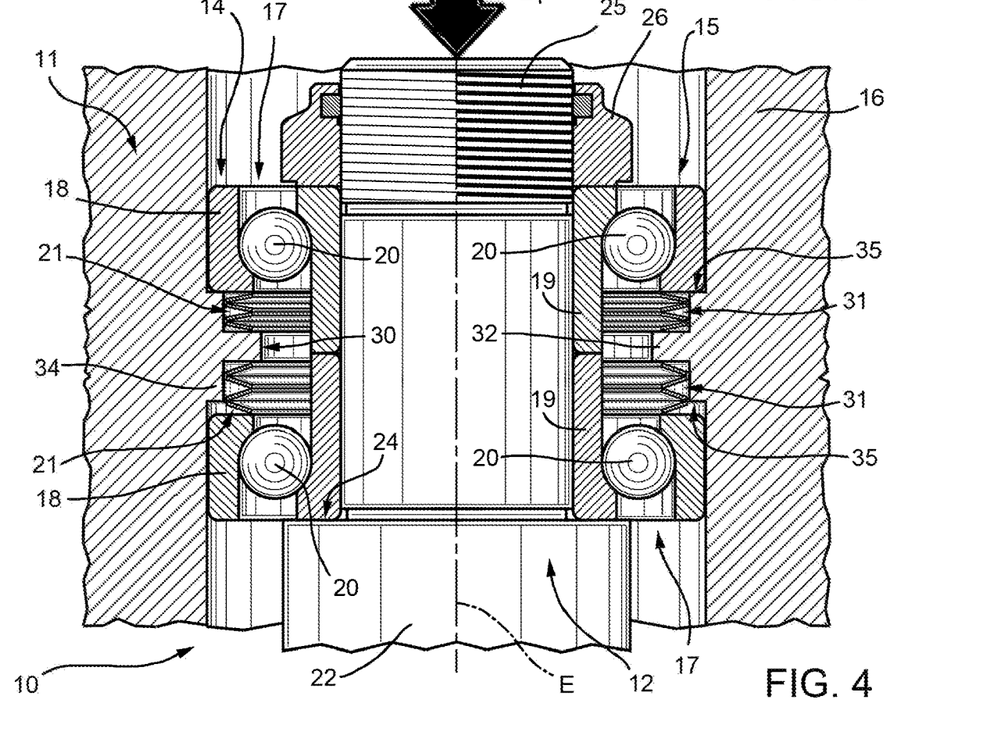

With reference to FIGS. 2, 3 and 4, the aircraft 1 further comprises a transmission 10, which transmits the power supplied by the motor 6 to the drive shaft 7

Specifically, the transmission 10 is a gear reducer and comprises:
- an external support casing 11;
- an input shaft 12 supported by the external casing 11 and connected to the motor 6; and
- an output shaft 13 supported by the external casing 11 and connected to the drive shaft 7.

The output shaft 13 and the input shaft 12 extend along the axis B and along an axis E respectively parallel to the axis B and they are rotating about the respective axes B, E.

The transmission 10 further comprises a plurality of transmission members, of the known type and not illustrated, to transmit the rotation of the input shaft 12 to the output shaft 13 with a lower angular velocity than that of the input shaft 12.

In order to couple the input shaft 12 to the external casing 11, the transmission 10 comprises a coupling assembly (FIGS. 3 and 4) and a coupling slot 15 defined by the external casing 11 and adapted to be engaged by the coupling assembly 14.

In greater detail, the external casing 11 comprises a cylindrical wall 16, which defines the coupling slot 15 and is arranged coaxially to the input shaft 12, i.e. about the axis E.

Furthermore, the coupling assembly 14 comprises a pair of oblique rolling bearings 17 mounted radially between the input shaft 12 and the wall 16, in particular, in axially facing positions.

The bearings 17 comprise:
- respective outer races or rings 18 radially cooperating in contact with the wall 16;
- respective inner races or rings 19 radially cooperating in contact with the input shaft 12; and
- respective pluralities of rolling elements 20 each arranged to roll between a corresponding outer ring 18 and a corresponding inner ring 19.

The coupling tolerances between the outer rings 18 and the wall 16 are such as to allow a limited relative axial movement between the input shaft 12 and the external casing 11.

Furthermore, the axial distance between the respective pluralities of rolling elements 20 is selected so that the transmission 10 has a good tolerance of potential tilting moments.

Advantageously, the coupling assembly 14 comprises a pair of preloaded elastic members 21, which couple the outer rings 18 to the support element 11 axially and in a yielding manner.

In other words, the outer rings 18 float along the axis E in response to the application of an axial load on the input shaft 12.

In greater detail, the outer rings 18 float according to the direction of the axial load itself.

On the other hand, the bearings 17 are mounted so that the inner rings 19 cannot slide axially along the input shaft 12.

In particular, as is visible in FIGS. 3 and 4, the bearings 17 are mounted in a back-to-back configuration. In this assembly configuration, the respective load transfer directions between the outer rings 18 and the inner rings 19 diverge between one another. In this way, the centers of thrust of the bearings 17, i.e. the ideal points of application of the loads on the bearings 17, are distanced from the bearings 17.

With this latter assembly configuration, the inner rings 19 are preferably made with an axial extension greater than the outer rings 18, with the purpose of axially distancing the pluralities of rolling elements 20 from one another. Alternatively or additionally, the coupling assembly 14 may comprise a spacer (not illustrated) for the same purpose, interposed axially between the inner rings 19.

Preferably, the outer rings 18 and the inner rings 19 are made of a first material, for example, an alloy steel, while the rolling elements 20 are made of a second material different from the first material, for example, a ceramic material. In particular, the first material has a coefficient of thermal expansion different from that of the second material and, more in particular, which is greater than that of the second material.

In other words, the bearings 17 are preferably of the so-called hybrid type.

In particular, the rolling elements 20 are defined by balls or tapered rollers respectively.

Figure 5:
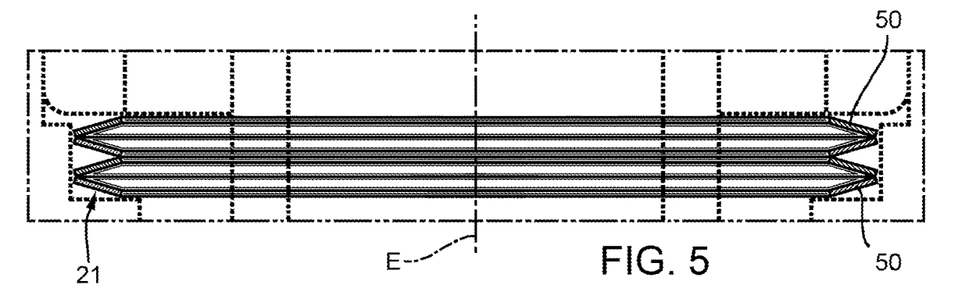
FIG. 5 is a further enlargement of a detail shown in FIG. 3.

In the specific example illustrated in FIGS. 3, 4, and 5, each of the elastic members 21 comprise a plurality of springs in series, which are each defined by a corresponding disk spring 50.

Figure 6:
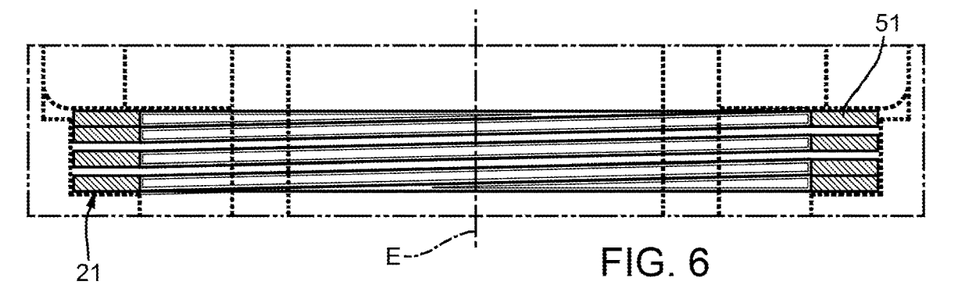
FIGS. 6 and 7 are similar to FIG. 5 and show respective possible variations of the detail in FIG. 5.
Figure 7:
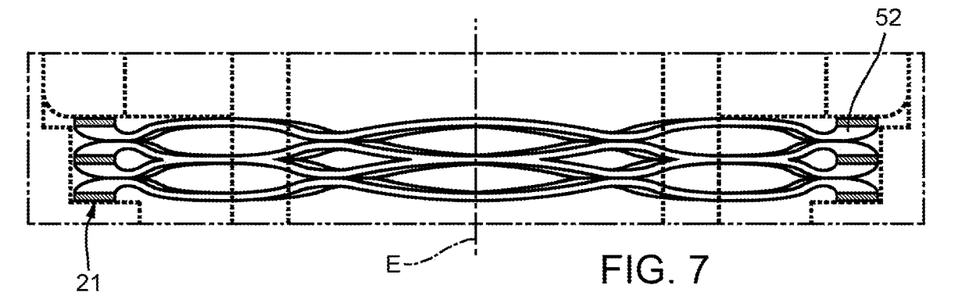

Alternatively, as shown in FIGS. 6 and 7 respectively, the disk springs 50 could be replaced by a helical spring 51 or by one or more wave springs 52.

Figure 10:
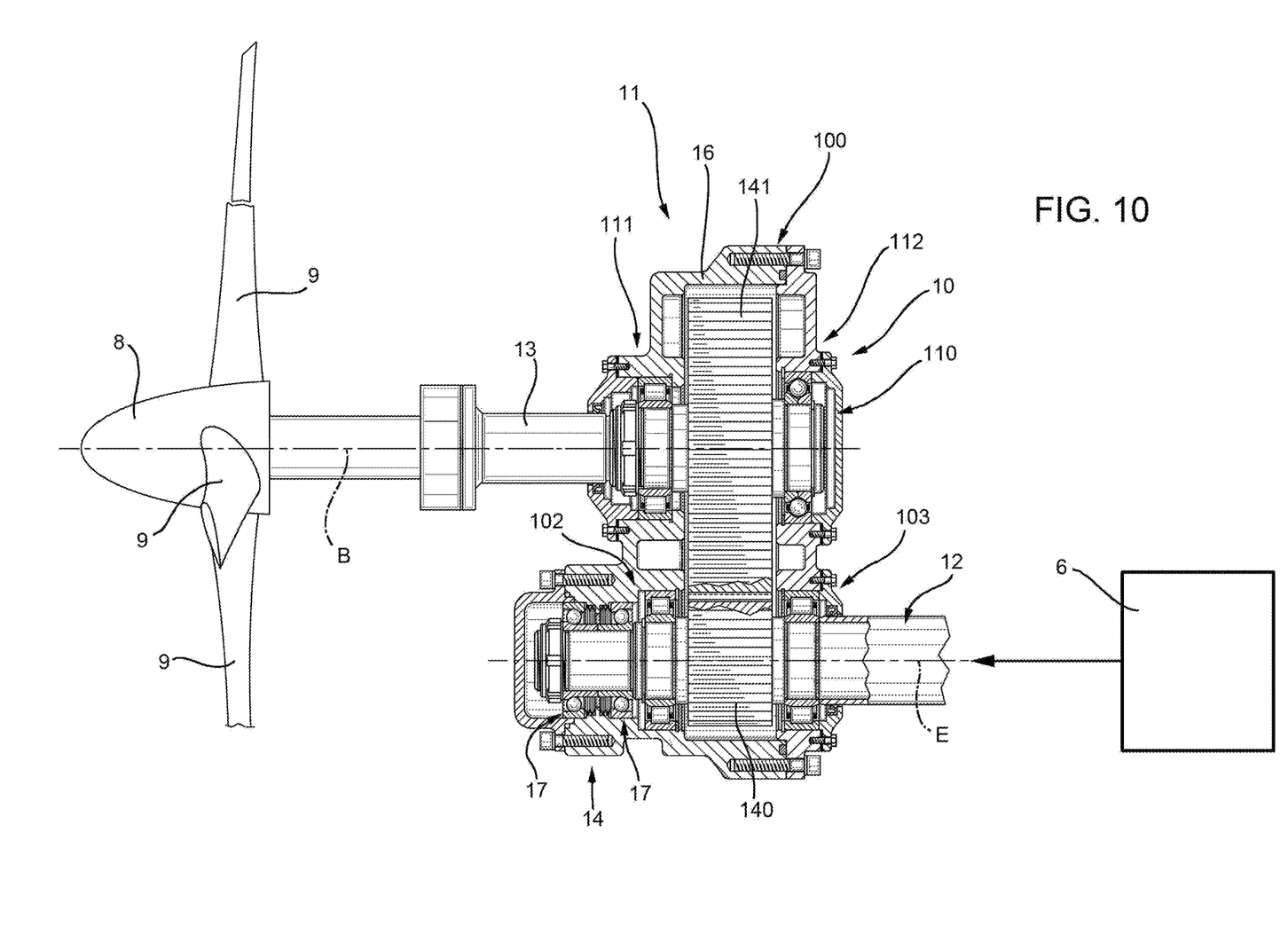
FIG. 10 is an enlarged view of a partial cross section of the transmission of FIG. 2.
Figure 11:
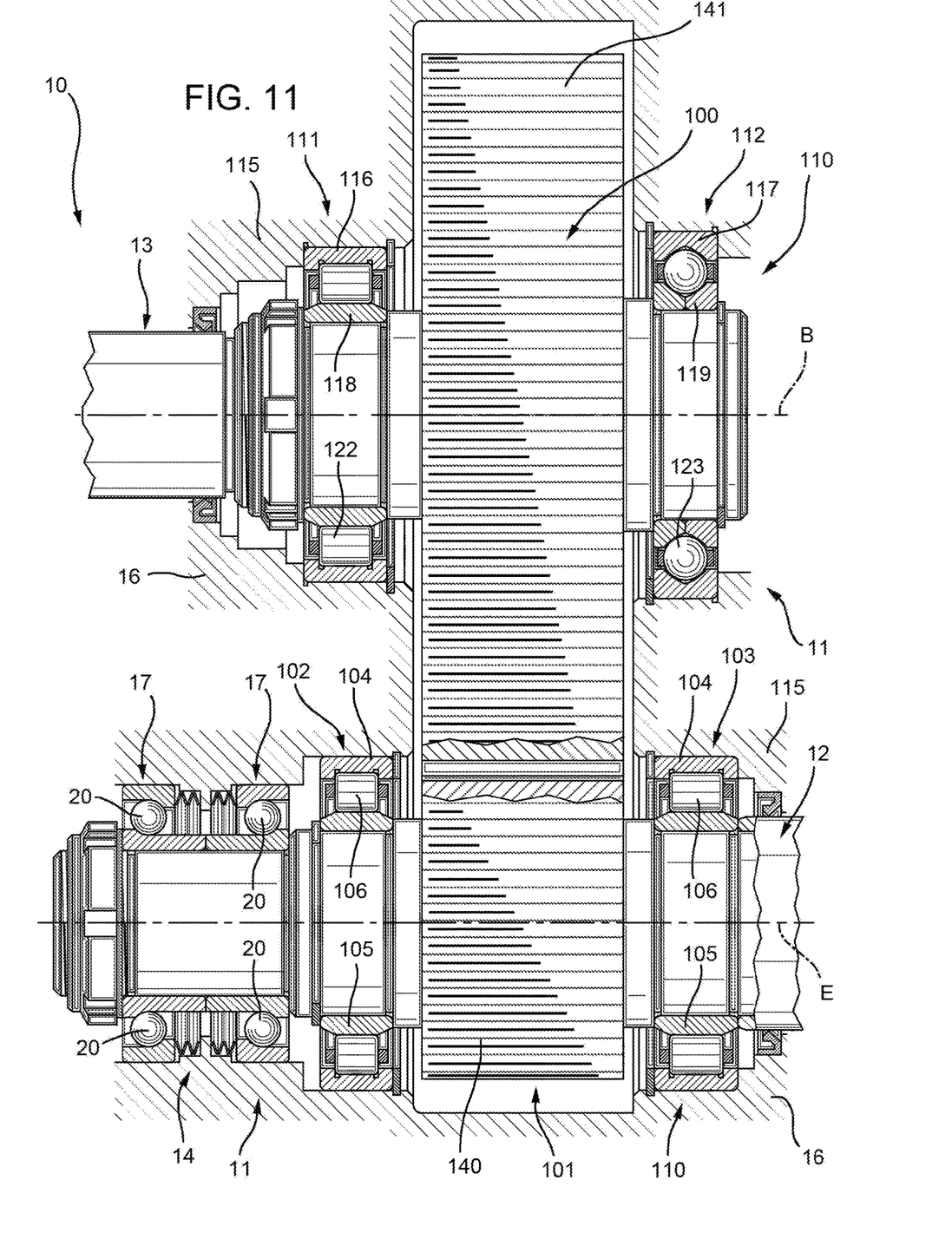
FIG. 11 is a view of the partial cross section of FIG. 10 in a further enlarged view.

The output shaft 13 is coupled to the casing 11 by means of a further coupling assembly 110 different from the coupling assembly 14, comprising rolling bearings 111, 112, which are mounted in an equally known manner and thus not described in detail (FIGS. 10 and 11).

Nonetheless, coupling assemblies similar to the coupling assembly 14 can be used for coupling other shafts of the aircraft 1 arranged in areas, which are subject to significant variations in operating temperatures.

Since such shafts would nonetheless be supported in a similar manner to the input shaft 12, only the coupling of the latter will be described in greater detail below.

In the specific example shown in FIGS. 3 and 4, the input shaft 12 is provided with a larger diameter portion 22 and a smaller diameter portion 23, which, together, define a shoulder 24 of axial abutment for one of the bearings 17.

On the side opposite the shoulder 24, with respect to the bearings 17, the smaller diameter portion 23 and the coupling assembly 14 are provided with a threaded portion 25 and a locking ring 26 respectively, which is screwed to the threaded portion 25 and cooperates with the other of the bearings 17 so as to preload the inner rings of the bearings 17 axially.

In greater detail, the locking ring 26 applies a predetermined axial load onto the inner rings 19, which is such that the input shaft 12 is supported radially and axially by the wall 16 by means of the bearings 17. Thus, the inner rings 19 are tightened axially to one another by means of the axial preload applied by the locking ring 26.

Each of the elastic members 21 is arranged between the relative outer ring 18 and the wall 16; furthermore, each of the elastic members 21 is compressed due to the relative preload and is in contact with both the wall 16 and the relative outer ring 18.

Therefore, one of the bearings 17 is tightened axially between the wall 16 and the locking ring 26, while the other of the bearings 17 is tightened axially between the wall 16 and the shoulder 22 by means of the respective elastic members 21.

In particular, the wall 16 defines a shoulder member 30 with annular-shape, protruding radially towards the input shaft 12, and positioned axially between the bearings 17 so as to define a pair of slots 31 for the elastic members 21.

The shoulder member 30 comprises a projection 32 arranged axially between the elastic members 21 and in contact with the latter.

Thus, the projection 32 defines a pair of shoulders 33 for the elastic members 21 opposite to each another, so that each of the outer rings 18 is coupled in an axially yielding manner to a corresponding shoulder 33 by means of the respective elastic member 21.

Preferably, the shoulder member 30 further comprises an annular base 34 arranged axially between the bearings 17, i.e. slightly raised radially with respect to the bearings 17, and from which the projection 32 protrudes radially towards the input shaft 12.

The base 34 defines a pair of shoulders 35 for the respective outer rings 18 opposite to each other, as well as defines the slots 31 together with the projection 32.

When the aircraft 1 is in rest conditions, i.e. in conditions of an absence of load on the input shaft 12, the elastic members 21 protrude in an axial direction with respect to the corresponding shoulders 35, so that the outer rings 18 are slightly spaced apart from the shoulders 35.

Therefore, the shoulders 35 constitute corresponding axial end-stops for the sliding of the outer rings 18, which sliding is allowed by the yielding of the elastic members 21 and is caused by loads exerted on the input shaft 12.

With special reference to FIGS. 10 and 11, transmission 10 further comprises:
- a gearing 100 which connects shafts 12, 13;
- a coupling assembly 101 for additionally rotatably supporting shaft 12 with respect to casing 11; and
- coupling assembly 110 for rotatably supporting shaft 13 with respect to casing 11.

Gearing 100 is, in the embodiment shown, a helical gearing. In particular, gearing 100 comprises a helix gearing 140 fitted to shaft 12 and meshing with a helix gearing 141 meshing with shaft 13.

In detail, coupling assembly 101 comprises a pair of rolling bearings 102, 103, which are arranged on respective axial opposite sides of gearing 100.

Rolling bearings 17 are arranged on one axial side of rolling bearings 102, 103 and gearing 100.

In the embodiment shown, rolling bearings 17 are arranged on the opposite axial side of gearing 100 and bearings 102, 103 with respect to engine 6.

Furthermore, rolling bearings 102, 103 are configured transmit only to the radial loads between casing 11 and shaft 12.

Differently, rolling bearings 17 are configured and operated to transmit only the axial load between casing 11 and shaft 12.

It should be pointed out that, in use, the whole radial loads acting on shaft 12 are borne by rolling bearings 102, 103. Accordingly, rolling bearings 17 bear only the axial loads acting on shaft 12.

In particular, bearings 102, 103 comprise (FIG. 11):
- respective outer races or rings 104 radially cooperating in contact with wall 16;
- respective inner races or rings 105 radially cooperating in contact with input shaft 12; and
- respective plurality of rolling elements 106, each arranged to roll between a corresponding outer races or ring 105 and a corresponding inner races or ring 104.

In the embodiment shown, rolling elements 106 are cylindrical roller.

Coupling assembly 110 comprises a pair of rolling bearings 111, 112, which are arranged on respective axial opposite sides of gearing 100.

In particular, rolling bearing 111 is axially arranged on the side of hub 8 with respect to gearing 100, while rolling bearing 112 is axially arranged on the opposite side of hub 8 with respect to gearing 100.

Furthermore, bearing 112 is an oblique bearing and is operated to transmit only the axial load acting on shaft 13 to casing 11 and vice-versa.

Bearing 111 is configured and operated to react only to the radial load acting on shaft 12.

In particular, bearings 111, 112 comprises:
- respective outer races or rings 116, 117 radially cooperating in contact with a wall 115 of casing 11;
- respective inner races or rings 118, 119 radially cooperating in contact with wall 115 of casing 11; and
- respective plurality of rolling elements 122, 123, each arranged to roll between a corresponding outer races or ring 120 and a corresponding inner races or ring 121.

In the embodiment shown, rolling element 123 are balls.

Races or rings 116, 118 are configured to radially and axially constrain bearing 111 to wall 17.

Rolling elements 122 are cylindrical rollers.

Races or rings 117, 119 are configured to both axially and radially constrain bearing 112 to wall 17.

During operation of the aircraft 1, the input shaft 12 and output shaft 13 are subject to varying axial and radial loads in modulus and direction, due to the operation of motor 6 and rotors 5.

Coupling assembly 14, 101 rotatably support input shaft 12 with respect to casing 11.

In greater detail, rolling bearings 102, 103 of coupling assembly 110 transmit the whole radial load acting on input shaft 12 to casing 11 and vice-versa.

Due to the fact that rolling bearings 102, 103 of coupling assembly 110 exert the whole radial load, rolling bearings 17 of coupling assembly 14 transmit only the axial acting on input shaft 12 to casing 11 and vice-versa.

Gearing 100 rotatably couples input shaft 12 with output shaft 13.

Coupling assembly 110 rotatably supports output shaft 13 with respect to casing 11.

In particular, FIG. 4 illustrates the behavior of the coupling assembly 14 when the input shaft 12 is subjected to an axial load P directed from the locking ring 26 to the shoulder 22.

The load P is transferred from the locking ring 26 to the inner rings 19 and, consequently, to the respective outer rings 18 by means of the corresponding rolling elements 20.

The inner rings 19 translate axially together with the input shaft 12 according to the direction of the load P and, accordingly, the corresponding rolling elements 20 and the outer rings 18 also translate along the same direction of the load P.

Thus, the elastic member 21 closest to the locking ring 26 is compressed until the relative outer ring 18 abuts with the corresponding shoulder 35; whereas, the other elastic member 21 extends following the distancing of the relative outer ring 18 from the corresponding shoulder 35.

Nonetheless, the elastic members 21 continuously guarantee the axial preload on the bearings 17 required for the correct operation of the transmission 10.

When the input shaft 12 is subjected to a load opposite the load P, the behavior of the coupling assembly 14 is perfectly symmetrical to that just described and illustrated in FIG. 4, so it is not described in further detail.

Being rolling element 20 of rolling bearings 17 radially unloaded, they axially move integrally with input shaft 12.

In other words, all the rolling element 20 remain in contact with inner rings 19 and outer rings 18, thus strongly reducing the generation of vibrations.

Figure 8:
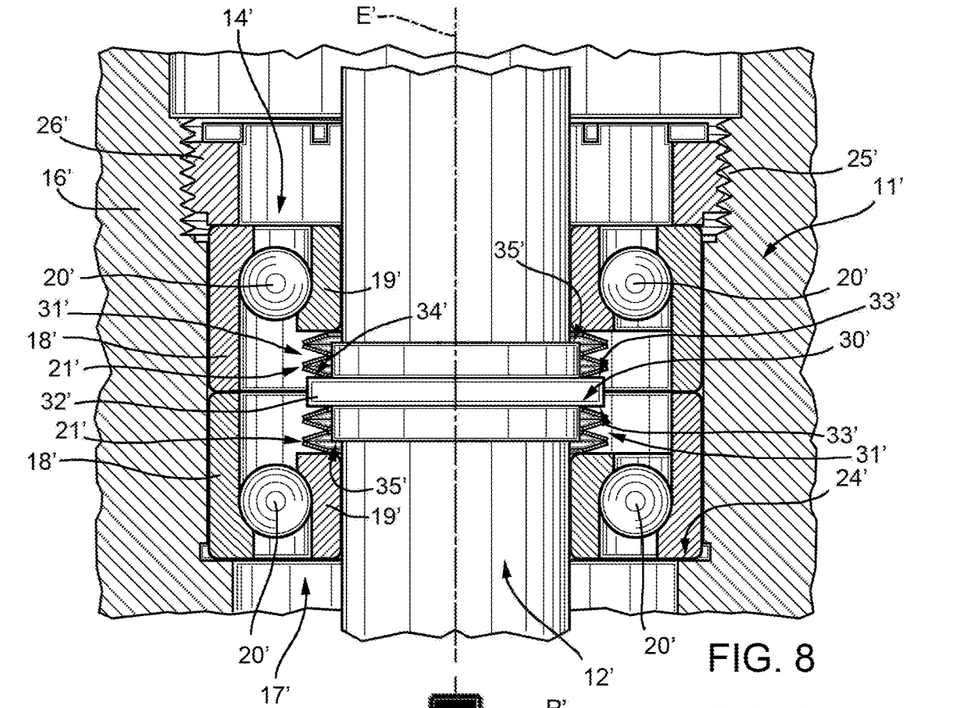
FIGS. 8 and 9 are similar to FIGS. 3 and 4 and relate to a dual variation of the transmission in FIG. 2.
Figure 9:
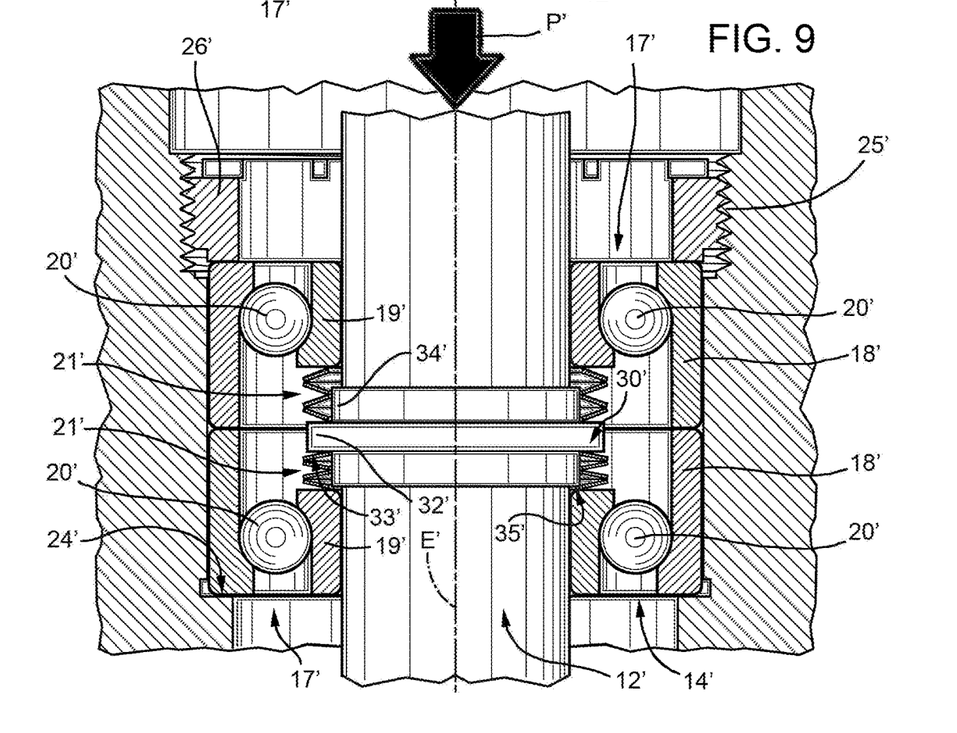

As an alternative to the transmission 10, FIGS. 8 and 9 illustrate a transmission 10', which is dual with respect to the transmission 10. Therefore, for the sake of simplicity, the transmission 10' will only be described below in terms of what distinguishes it from the transmission 10.

In particular, the components of the transmission 10', which are functionally equivalent to those of the transmission 10, will be identified below by the same numeral reference used for the transmission 10 and followed by an inverted comma (').

In detail, the transmission 10' comprises a casing 11' provided with a wall 16', an input shaft 12' and a coupling assembly 14', in turn comprising:

- a pair of bearings 17' having respective outer rings 18', respective inner rings 19', and respective pluralities of rolling elements 20'; and
- a pair of preloaded elastic members 21', which, advantageously, couple the inner rings 19' to the input shaft 12' axially and in a yielding manner.

In other words, in dual mode with the outer rings 18 with respect to the wall 16, a relative axial motion occurs between the inner rings 19' and the input shaft 12' in response to the application of an axial load on the latter.

In particular, the input shaft 12' has a freedom of movement along the axis E' thereof, while the inner rings 19' are held in the axial position thereof by means of the preload of the elastic members 21'.

In dual mode with the bearings 17, the bearings 17' are mounted so that the outer rings 18' cannot slide axially along the wall 16'. Furthermore, the bearings 17' are mounted in a face-to-face configuration. In this configuration, the respective load transfer directions between the outer rings 18' and the inner rings 19' converge with one another. The thrust centers are thus arranged between the bearings 17', so the transmission 10' is less rigid than the transmission 10. On the other hand, the recovery of the clearances in operation is facilitated.

In particular, in dual mode with the input shaft 12, the wall 16' defines a threaded portion 25' and a shoulder 24' at axially opposed parts to the bearings 17'.

Thus, the coupling assembly 14' comprises a locking ring 26', which is screwed to the threaded portion 25' to preload the outer rings 18', so that the outer rings 18' are axially tightened between the locking ring 26' and the shoulder 24'.

Furthermore, in dual mode with the wall 16, the input shaft 12' defines a shoulder member 30', which has the same shape of the shoulder member 30, but which protrudes radially towards the wall 16'.

Like the shoulder member 30, the shoulder member 30' is positioned axially between the bearings 17' so as to define a pair of slots 31' for the elastic members 21'.

Thus, the shoulder member 30' comprises, in particular, a base 34' and a projection 32' protruding radially from the base 34' towards the wall 16'. Furthermore, the base 34' and the projection 32' define a pair of shoulders 33' for the elastic members 21' in the slot 31' and a pair of shoulders 35' for the inner rings 19' respectively.

Clearly, when the input shaft 12' is subjected to a load P' directed from the locking ring 26' towards the shoulder member 30', the behavior of the coupling assembly 14' is perfectly dual with the behavior of the coupling assembly 14 under the action of the load P.

In particular, as shown in FIG. 9, the input shaft 12' moves away from the locking ring 26' compressing the elastic member 21' that is more spaced from the locking ring 26', until the adjacent inner ring 19' abuts with the shoulder 35'.

Here, the inner ring 19' transfers the load P' to the corresponding rolling elements 20' and, consequently, to the relative outer ring 18'. The latter outer ring 18', together with the other outer ring 18', transfer the load P' onto the wall 16' by means of the shoulder 24' and the locking ring 26' respectively.

At the same time, the elastic member 21' closest to the locking ring 26' extends in order to maintain the axial position of the inner ring 19', keeping the latter under load.

When the input shaft 12' is subjected to a load opposite the load P', the behavior of the coupling assembly 14' is perfectly symmetrical to that just described and illustrated in FIG. 9, so it is not described in further detail.

The advantages of the aircraft 1 and of method of operating aircraft 1 are apparent from the above.

In particular, the reactions of the elastic members 21, 21', which act on the outer rings 18 and on the inner rings 19' respectively, allow an immediate recovery of any clearances deriving from different thermal expansions of the outer rings 18, 18' and/or the inner rings 19, 19' with respect to thermal expansions of the rolling elements 20, 20'.

Furthermore, the coupling assemblies 14, 14' guarantee a more precise and robust arrangement of the axial preload on the bearings 17, 17', with respect to the known solutions.

Thus, the transmissions 10, 10' remain stable within relatively broad temperature ranges. In particular, convertiplanes must be able to operate efficiently both with highly rigid environmental start-up temperatures, for example −50° C., and with operating temperatures in excess of 200° C., in conditions of critical transmission lubrication.

Furthermore, the stability of the transmissions 10, 10' is practically untouched by sudden changes in direction of the loads, which, in use, are exerted on the transmissions 10, 10'.

Moreover, due to the shoulders 35, 35' the risk of overloading and/or fatigue failure of the elastic members 21, 21' is practically eliminated. The shoulders 35, 35' reduce to a minimum the possibility of normally undesired relative axial motion between the input shafts 12, 12' and the respective walls 16, 16'.

The arrangement of the elastic members 21, 21' is such that the overall rigidity thereof is added together, so the transmissions 10, 10' are particularly rigid and efficient.

Still more precisely, shaft 12, 12' (or casing 11, 11') comprises:
- a pair of shoulders 33, 33' axially arranged between springs 21, 21' and coupled to first races 18, 19; 18', 19' by springs 21, 21' in an elastically yielding manner in axial direction; and
- a pair of shoulders 35, 35' axially facing respective races 18, 19, 18', 19' of respective bearings, so as to define respective axial end stop for races 18, 19; 18', 19'.

Furthermore, first races 18, 19, 18', 19' float, along third axis E, E', in response to the application of an axial load on shaft 12, 12' (or casing 11, 11'); and coupling assembly 101 comprises radial rolling bearings 102, 103 configured to transfer radial loads from said input shaft 12, 12' to casing 11, as shown in FIGS. 10 and 11.

Due to the operation of engine 6, shaft 13 and, therefore, shaft 12', 12' undergo both radial and load axis.

Being the whole radial loads reacted by the bearings 102, 103, it is possible to react only the whole axial loads by means of bearings 17, 17'.

Bearing mind that bearing 17, 17' only react to bidirectional axial loads, the effect of the presence of two spring 21, 21' interposed between first shoulder 33, 33' and respective end stops 35, 35' is explained with reference to FIG. 4.

In particular, when the input shaft 12 is subjected to an axial load P directed from the locking ring 26 to the shoulder 22, load P is transferred from the locking ring 26 to the inner rings 19 and, consequently, to the respective outer rings 18 by means of the corresponding rolling elements 20.

The inner rings 19 translate axially together with the input shaft 12 according to the direction of the load P and, accordingly, the corresponding rolling elements 20 and the outer rings 18 also translate along the same direction of the load P.

Thus, on one hand, the elastic member 21 closest to the locking ring 26 is compressed until the relative outer ring 18 abuts with the corresponding shoulder 35, so as to avoid any axial play between races 18, 19 and rolling elements 20 of bearing 17 closest to the locking ring and therefore substantially preserving the pre-load of this bearing 17.

On the other hand, the other elastic member 21 farthest from locking ring 25 extends following the distancing of the relative outer ring 18 from the corresponding shoulder 35. Also in this case, any axial play between races 18, 19 and rolling elements 20 of bearing 17 farthest from the locking ring is avoided, thus substantially preserving the pre-load of this bearing 17.

Needless to say, the operation of coupling assembly 14 is symmetric when load P is directed in the opposite direction from shoulder 22 to locking ring 26.

In this way, it is possible to ensure a precise and robust setting of axial pre-load. This setting is particularly stable within a very wide range of temperature. In the same way, the rolling elements are well guided in case of inversion of axial load.

It is worth remarking that the operation of elastic member 21 is in no way affected by the presence of any radial load acting on shaft 12, 12'. In other words, the contact between the balls 20 and races 18, 19 is constantly ensured also when shaft 12, 12' undergo relevant radial loads.

This is simply due to the fact that the radial loads are not reacted by bearings 17, 17'.

Accordingly, the operation of bearings 17, 17' in terms of constant contact between balls 20 and races 18, 19, low noise/vibrations and reduced impact between balls 20 is optimized also in case of radial loads.

Finally, from the above, it is clear that modifications and changes can be made to the aircraft 1 and to method of operating aircraft 1, without departing from the scope of protection defined by the appended claims.

In particular, the aircraft 1 could also be defined by a helicopter or a gyrodyne, rather than by a convertiplane, as described and illustrated.

Furthermore, the arrangement of the elastic members 21, 21' could differ from the arrangement described and illustrated above. More specifically, the outer rings 18, 18' and the inner rings 19, 19' could be arranged between the elastic members 21, 21', instead of vice versa as described and illustrated above. In this case, the shoulder members 30, 30', if present, would consequently be re-positioned, defining the slots 31, 31' of the elastic members 21, 21'.

The assembly configuration of the bearings 17, 17' could be face-to-face and back-to-back respectively, instead of back-to-back and face-to-face as described and illustrated. In other words, the preload on the bearings 17 could be applied to the outer rings 18 and the preload on the bearings 17' could be applied to the inner rings 19' respectively.

In this case, a locking ring similar to the locking ring 26 would be screwed onto a threaded portion (not shown) of the input shaft 12' to preload the inner rings 19', while a locking ring similar to the locking ring 26' would be screwed onto a threaded portion (not shown) of the wall 16 to preload the outer rings 18.

Moreover, again in this last case, one of the shoulders 35 or one of the shoulders 35' and one of the shoulders 33 or one of the shoulders 33' could also be defined respectively by the same locking rings similar to the locking rings 26', 26, instead of by the wall 16 and by the input shaft 12.

In fact, also in this last case, the outer rings 18 and the inner rings 19' would nonetheless be coupled in an axially yielding manner, even though indirectly, to the wall 16 and to the input shaft 12', such locking rings being screwed directly to the wall 16 and to the input shaft 12'.

The invention claimed is:
1. An aircraft (1) comprising:
- a fuselage (2) with a first longitudinal extension axis (A) between a nose (2a) and a tail portion (2b) opposite along said first longitudinal extension axis (A);
- a pair of half-wings (3) extending in a cantilever fashion from respective opposite sides of said fuselage (2) and transversely to said first longitudinal extension axis (A);
- a pair of nacelles (4); and
- a pair of rotors (5);

each said rotor (5) comprising, in turn:
- a motor (6);
- a drive shaft (7) rotatable about a second axis (B);
- a hub (8) dragged, in use, into rotation by said drive shaft (7);
- a plurality of blades (9), which are articulated on said hub (8);

said aircraft (1) further comprising a transmission (10) which transmits, in use, the power from said motor (6) to said drive shaft (7);

said transmission (10) being a gear reducer and comprising:
an external support casing (11);
an input shaft (12, 12') supported by said external support casing (11) and connected to said motor (6); and
an output shaft (13) supported by said external support casing (11) and connected to said drive shaft (7);
said external support casing (11) comprising a support element (16; 16');
said input shaft (12; 12') rotating, in use, about a third axis (E, E');
said transmission (10) comprising a first coupling assembly (14) for coupling said input shaft (12) to said external support casing (11);
said first coupling assembly (14) comprising a pair of oblique first rolling bearings (17; 17') mounted so as to couple said input shaft (12; 12') to said support element (16; 16') in a rotating manner about said third axis (E, E');
said first rolling bearings (17; 17') comprising:
respective first races (18, 19; 18', 19') cooperating radially in contact with a first component (16, 12; 16', 12') defined by one from said support element (16; 16') and said input shaft (12; 12');
respective second races (19, 18; 19', 18') cooperating radially in contact with a second component (12, 16; 12', 16') defined by the other from said support element (16; 16') and said input shaft (12; 12'); and
respective pluralities of rolling elements (20; 20') adapted to roll on said first and said second races (18, 19; 18' 19'; 19, 18; 19', 18');
characterized by further comprising a pair of preloaded elastic members (21; 21'), which couple said first races (18, 19; 18', 19') to said first component (16, 12; 16', 12') respectively, axially and in an elastically yielding manner;
wherein said pair of preloaded elastic members (21; 21') is arranged axially between said first races (18, 19; 18', 19');
wherein said first component (16, 12; 16', 12') defines a pair of first shoulders (33; 33') arranged axially between said pair of preloaded elastic members (21; 21'); said pair of preloaded elastic members (21; 21') coupling said first races (18, 19; 18', 19') to said first shoulders (33; 33') respectively, in an elastically yielding manner in an axial direction;
wherein said first component (16, 12; 16', 12') defines a pair of second shoulders (35; 35') respectively axially facing said first races (18, 19; 18', 19'), so as to define respective axial end-stops for said first races (18, 19; 18', 19');
said output shaft (13) being coupled to said external support casing (11) by means of a second coupling assembly (110), which comprises at least one second rolling bearing (111, 112);
said first races (18, 19; 18', 19') being configured to float, in use, along said third axis (E, E') in response to the application of an axial load on said first component (16, 12; 16', 12');
said transmission (30) further comprising a third coupling assembly (101) for rotatably supporting said input shaft (12, 12') with respect to said external support casing (11);

said third coupling assembly (101) comprising at least one third radial rolling bearing (102, 103) configured to transfer whole radial loads from said input shaft (12, 12') to said external support casing (11);
said oblique first rolling bearings (17, 17') being configured to transfer an axial load from said input shaft (12, 12') and said external support casing (11) and being operated to transfer only said axial load, in use.

2. The aircraft according to claim 1, wherein said first races (18, 19; 18', 19') are made of a first material and said rolling elements (20; 20') are made of a second material different from said first material and having a coefficient of thermal expansion different from that of said first material.

3. The aircraft according to claim 1, wherein said first races (18, 19; 18', 19') are arranged axially between said pair of preloaded elastic members (21; 21').

4. The aircraft according to claim 1, wherein said first component (16, 12; 16', 12') defines a shoulder member (30; 30') comprising a base (34; 34') and a projection (32; 32') which protrudes radially towards said second component (12, 16; 12', 16'), defining a pair of slots (31; 31') with said base (34; 34') respectively engaged by said pair of preloaded elastic members (21; 21'); said base (34; 34') and said projection (32; 32') defining said pair of second shoulders (35; 35') and said pair of first shoulders (33; 33') respectively.

5. The aircraft according to claim 1, wherein each of said pair of preloaded elastic members (21; 21') comprises one or more springs (50; 51; 52) arranged in series and each spring selected from the group consisting of:
a disk spring (50);
a helical spring (51); and
a wave spring (52).

6. The aircraft according to claim 1, wherein:
said first races (18, 19; 18', 19') are defined by respective radially external races (18, 18') of said oblique first rolling bearings (17); and
said first component (16, 12; 16', 12') is defined by said support element (16; 16');
said pair of oblique first rolling bearings (17) being mounted in a back-to-back configuration.

7. The aircraft according to claim 1, wherein:
said first races (18, 19; 18', 19') are defined by respective radially internal races (19, 19') of said oblique rolling bearings (17'); and
said first component (16, 12; 16', 12') is defined by said input shaft (12; 12');
said pair of oblique first rolling bearings (17') being mounted in a face-to-face configuration.

8. The aircraft according to claim 1, characterized said third coupling assembly (101) is axially interposed between said motor (6) and said first coupling assembly (14).

9. The aircraft according to claim 1, characterized in that said transmission (10) comprises a helix gearing (100) for rotatably coupling said first input shaft (12) and said output shaft (13).

10. The aircraft according to claim 9, characterized in that said helix gearing (100) is axially interposed between said third radial rolling bearing (102, 103).

11. The aircraft according to claim 9, characterized in that said second coupling assembly (110) comprises said second rolling bearing (111) and a fourth rolling bearing (112);
said gearing (100) being axially interposed between said second rolling bearing (111) and said fourth rolling bearing (112);
said fourth rolling bearing (112) being an oblique rolling bearing configured to transmit both radial and axial forces from said output shaft (13) to said external support casing (11);

said second rolling bearing (111) being a radial rolling bearing configured to transmit only radial forces from said output shaft (13) to said external support casing (11).

12. The aircraft according to claim 1, characterized in that said third coupling assembly (101) comprises a pair of said third radial rolling bearings (102, 103).

13. The aircraft according to claim 1, defined by one from: a helicopter; a convertiplane; and a gyrodyne.

14. A method of operating an aircraft (1), the method comprising:
    providing the aircraft (1) including:
    a fuselage (2) with a first longitudinal extension axis (A) between a nose (2a) and a tail portion (2b) opposite along said first longitudinal extension axis (A);
    a pair of half-wings (3) extending in a cantilever fashion from respective opposite sides of said fuselage (2) and transversely to said first longitudinal extension axis (A);
    a pair of nacelles (4); and
    a pair of rotors (5);
    each said rotor (5) comprising, in turn:
    a motor (6);
    a drive shaft (7) rotatable about a second axis (B);
    a hub (8) dragged, in use, into rotation by said drive shaft (7);
    a plurality of blades (9), which are articulated on said hub (8);
    said aircraft (1) further comprising a transmission (10) which transmits, in use, the power from said motor (6) to said drive shaft (7);
    said transmission (10) being a gear reducer and comprising:
        an external support casing (11);
        an input shaft (12, 12') supported by said external support casing (11) and connected to said motor (6); and
        an output shaft (13) supported by said external support casing (11) and connected to said drive shaft (7);
        said external support casing (11) comprising a support element (16; 16');
        said input shaft (12; 12') rotating, in use, about a third axis (E, E');
        said transmission (10) comprising a first coupling assembly (14) for coupling said input shaft (12) to said external support casing (11);
    said first coupling assembly (14) comprising a pair of oblique first rolling bearings (17; 17') mounted so as to couple said input shaft (12; 12') to said support element (16; 16') in a rotating manner about said third axis (E, E');
    said first rolling bearings (17; 17') comprising:
        respective first races (18, 19; 18', 19') cooperating radially in contact with a first component (16, 12; 16', 12') defined by one from said support element (16; 16') and said input shaft (12; 12');
    respective second races (19, 18; 19', 18') cooperating radially in contact with a second component (12, 16; 12', 16') defined by the other from said support element (16; 16') and said input shaft (12; 12'); and
    respective pluralities of rolling elements (20; 20') adapted to roll on said first and said second races (18, 19; 18' 19'; 19, 18; 19', 18');
        said aircraft (1) further comprising a pair of preloaded elastic members (21; 21'), which couple said first races (18, 19; 18', 19') to said first component (16, 12; 16', 12') respectively, axially and in an elastically yielding manner;
        wherein said pair of preloaded of elastic members (21; 21') is arranged axially between said first races (18, 19; 18', 19');
        wherein said first component (16, 12; 16', 12') defines a pair of first shoulders (33; 33') arranged axially between said pair of preloaded elastic members (21; 21'); said pair of preloaded elastic members (21; 21') coupling said first races (18, 19; 18', 19') to said first shoulders (33; 33') respectively, in an elastically yielding manner in an axial direction;
        wherein said first component (16, 12; 16', 12') defines a pair of second shoulders (35; 35') respectively axially facing said first races (18, 19; 18', 19'), so as to define respective axial end-stops for said first races (18, 19; 18', 19');
        said output shaft (13) being coupled to said external support casing (11) by means of a second coupling assembly (110), which comprises at least one second rolling bearing (111, 112);
        said first races (18, 19; 18', 19') being configured to float, in use, along said third axis (E, E') in response to the application of an axial load on said first component (16, 12; 16', 12'); and
        said transmission (30) further comprising a third coupling assembly (101) for rotatably supporting said input shaft (12, 12') with respect to said external support casing (11);
    the method characterized by the steps of:
        transferring whole radial loads from said input shaft (12, 12') of said third coupling assembly (101) by means of at least one third radial rolling bearing (102, 103) of said third coupling assembly (101); and
        transferring only an axial load from said input shaft (12, 12') and said external support casing (11) by means of said oblique first rolling bearings (17, 17').

* * * * *